United States Patent Office 3,281,911
Patented Nov. 1, 1966

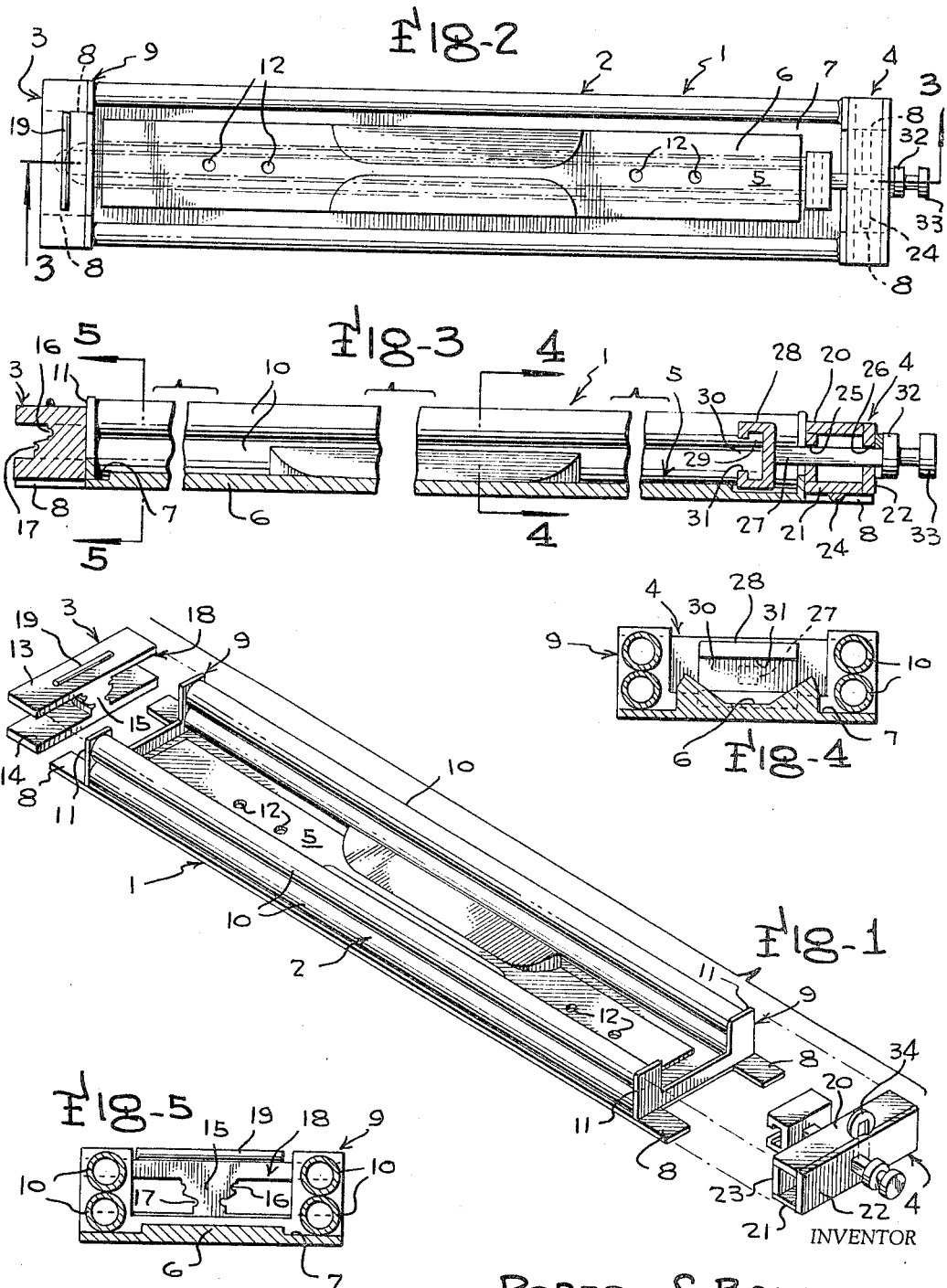

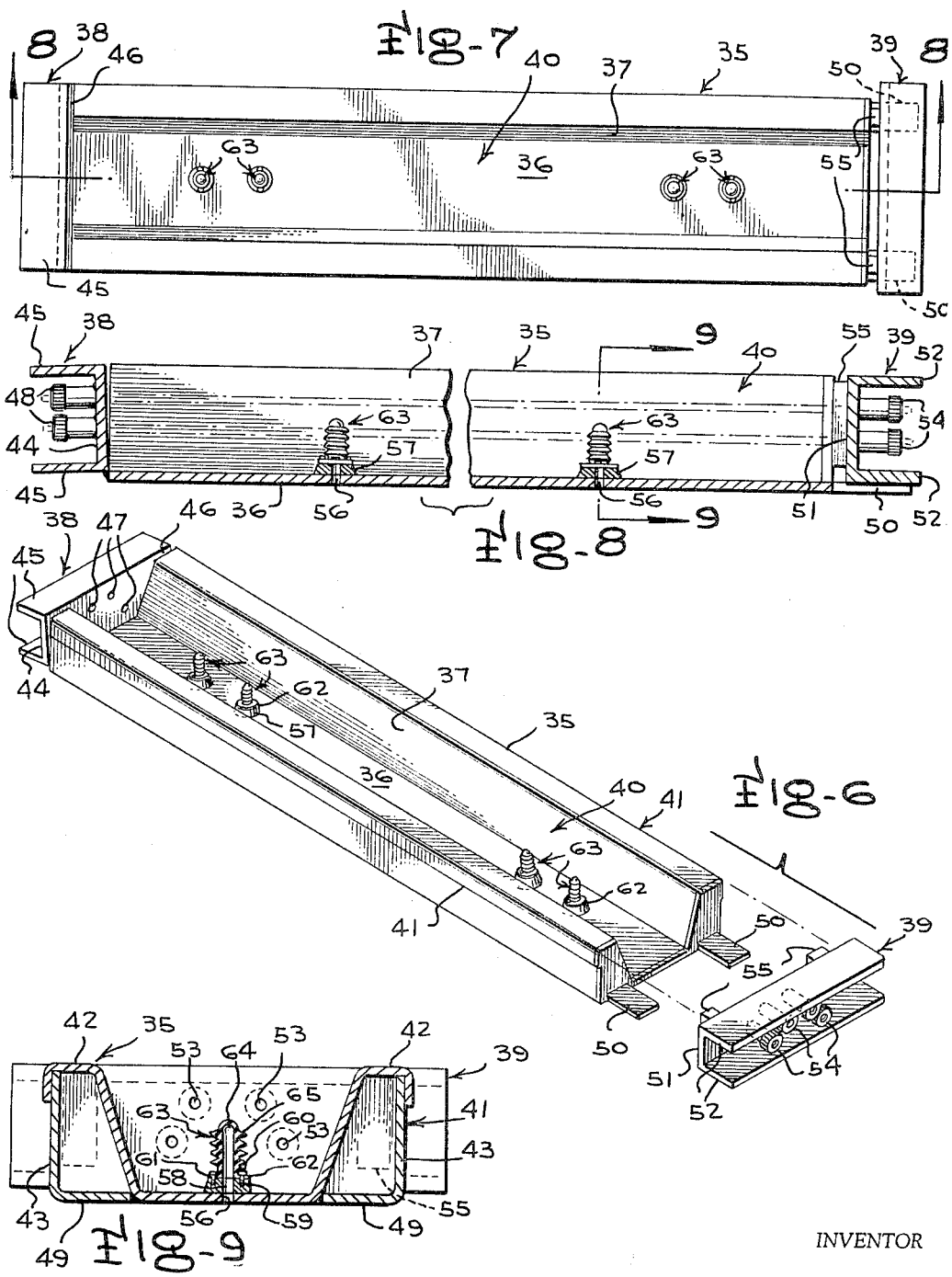

3,281,911
PALLET FOR MAKING PRESTRESSED CONCRETE
Robert S. Baker, Tampa, Fla., assignor, by mesne assignments, to American Concrete Crosstie Corporation, Tampa, Fla., a corporation of Florida
Original applications Oct. 5, 1959, Ser. No. 844,441, now Patent No. 3,128,521, dated Apr. 14, 1964, and Feb. 11, 1964, Ser. No. 344,095. Divided and this application Apr. 13, 1964, Ser. No. 359,053
3 Claims. (Cl. 25—118)

This invention relates to pallets for molding prestressed concrete members, and more particularly to such pallets for use in automatic machines for molding prestressed concrete members, and is a division of copending applications, Serial No. 844,441, entitled Apparatus for Molding Prestressed Concrete Members, filed October 5, 1959, now Patent No. 3,128,521, issued April 14, 1964, and Serial No. 344,095, entitled Machine for Making Prestressed Concrete Members, filed February 11, 1964.

In the above mentioned applications, two machines are disclosed for automatically feeding, cutting, anchoring and tensioning cables in pallets movable along a pallet feed path. After the cables are tensioned, a mold box is moved into association with the pallet and concrete is poured into the associated box and pallet and tamped and vibrated. The pallet with the shaped concrete member is removed from the machine for curing. During the pouring, tamping and curing operations, the cables are held under tension by connection to the pallet only, and after curing the cables are cut and the member is removed, leaving the pallet free to receive more cables and repeat the cycle of operation.

The principal object of the invention is to provide pallets having means to hold cables tensioned while the concrete is poured and during the ensuing curing period, whereby the pallet is capable of maintaining cable tension while the pallet is moved or stored and the concrete member can be formed in automatic equipment and the pallet with the uncured concrete member may be freely moved from the equipment.

A more specific object is to provide pallets of the above mentioned type wherein means are incorporated to permit engagement of the ends of stressing cables while the cables are relaxed, which means are capable of relative separation to tension the cables and can be held in the separated condition to maintain cable separation.

Other objects of the invention will become apparent from the following description of practical embodiments thereof, when taken in conjunction with the drawings which accompany, and form part of, this specification.

In the drawings:

FIGURE 1 is an exploded perspective view of a pallet embodying the principles of the present invention;

FIGURE 2 is a top plan view of the structure of FIGURE 1 shown in assembled position;

FIGURE 3 is a longitudinal section through the pallet, taken on the line 3—3 of FIGURE 2;

FIGURE 4 is a transverse section taken through the pallet on the line 4—4 of FIGURE 3, looking toward one end of the pallet;

FIGURE 5 is another transverse section taken through the pallet on the line 5—5 of FIGURE 3, looking toward the opposite end of the pallet;

FIGURE 6 is a perspective view of a modified form of pallet, one header of the member being removed from the body section;

FIGURE 7 is a top plan view of the pallet of FIGURE 6 in assembled position;

FIGURE 8 is a longitudinal section through the modified pallet taken on the line 8—8 of FIGURE 7; and FIGURE 9 is a transverse section taken on the line 9—9 of FIGURE 8.

In general, the invention is concerned with pallets arranged to receive and hold cables strung lengthwise of the pallet. There are means at the opposite ends of the pallet to engage and hold the cables. These means can be separated longitudinally of the pallet to tension the cables and hold them tensioned. In one form of the invention, the cables are bent around a post at one end of the pallet and all ends are anchored in a header at the other end. In the other form, the cable ends are anchored in headers at the opposite ends of the pallet. In both forms, the tension stresses are carried from one header to the other through the body of the pallet. In one form of pallet the concrete member is poured and supported in upright position, while in the other form the member is inverted.

Referring first to that form of the invention shown in FIGURES 1 through 5, there is shown a pallet which is particularly adapted for use with a machine such as that disclosed in above mentioned application Serial No. 844,441, wherein cables are strung along a pair of pivoted arms while the arms are in alignment, and the arms then swung into parallel adjacency to wrap the cables around a post on the pallet and bring anchored ends of the cables into engagement with a header at the opposite end of the pallet.

The pallet 1 is composed of an elongated body member 2, a dead end header 3 and a jacking header 4.

The pallet body is an elongated member which is essentially channel shaped in cross-section to provide the requisite rigidity to withstand the cable tension which will be imposed longitudinally upon it. In the form of FIGURES 1 to 5, the pallet body bottom 5 is made as a rectangular casting. The central portion of the upper surface is raised in a generally rectangular area 6 and contoured to provide the desired bottom shape for the member to be molded, in the form shown a railway tie. The raised central area 6 is of proper size and located so as to fit snugly within the mold box of the mentioned machine, and the peripheral area 7 of the pallet body is flat to seat against the bottom edges of the mold box. The base portion of the pallet has a small ledge, or foot, 8 projecting outwardly longitudinally of the base from each corner. These feet will provide spaced platforms for the headers 3 and 4, as will be seen. At each end of the base, a U-shaped end plate 9 is welded in an upright position across the end of the base to form end abutments for tubular spreaders 10, which have their ends fixed to the vertical legs 11 of the end plates, and extend the full length of the pallet. Two tubular spreaders 10 are arranged one above the other along each side of the pallet body. The pallet base is sufficiently wide so that the mold box of the machine will fit between the spreaders and the raised area 6 of the base. Thus it will be seen that the pallet has the form of a channel type girder, with the cast base 5 forming the channel bottom and the superposed tubular spreaders forming the side walls. The major load imposed against the end plates 9 will be taken directly by the spreaders as an end thrust. The base of the pallet body has a plurality of openings 12 which will serve as locating openings in positioning the pallet relative to a machine position, or for locating bolt, or anchoring, members which may be required.

The dead end header 3 is a bridging member adapted to seat upon the feet 8 at one end of the pallet body and span the U-shaped end plates of the body and form a holding means for the cables to be tensioned. This header will have the cables wrapped around it, and its pulling forces will be exerted against the central bight of doubled over cables. The header is approximately as long as the width of the pallet base so that its ends may have maximum bearing against the legs of the U-shaped end plate of the base. It has upper and lower plates, or flanges, 13 and 14, held in spaced relation by means of a center post 15. The center post is flush with those edges of the top and bottom flanges which will bear against the end plate 9. The center post is grooved, as at 16 and 17, with the grooves vertically spaced apart in accordance with the vertical spacing in the particular cable pattern to be used. The inner surface of the post 15 is convexly curved, and the grooves follow the arcuate curvature so that no sharp cable bends will occur. The grooves are struck from different radii, so that the cables will have the proper lateral spacing required by the cable pattern. Due to the fact that the cable lengths which will be laid in the pallet are identical, the grooves in post 15 are not concentric, but the groove having the smaller radius is displaced inwardly of the bearing face 18 of the header a greater distance than the groove of larger diameter. Thus, the cable having the sharper bend will have its bight held further from the header bearing face by a distance sufficient to compensate for the difference in cable lengths required to make the respective bends. The headers may have positioning ribs 19 along at least a portion of the exposed surfaces of the top and bottom flanges for cooperation with the members of the forming machine in some operations.

The jacking header 4 is of somewhat different construction. The header proper, that is that portion which spans the U-shaped end plate 9 of the pallet base, is of box-like construction having upper and lower plates 20 and 21, a back plate 22 and a separator 23 between the bearing edges of the plates 20 and 21. The parts are welded together, or otherwise joined to form a tubular member. A positioning rib 24 projects from the bottom of the lower plate 21.

The tubular header just described is provided with openings 25 and 26 in the separator and back plates to slidably receive a square jacking shaft 27. Shaft 27 carries at its front end, that is the end toward the pallet body, an anchor plate-receiving coupler 28. This coupler has a plate chanel 29 extending completely through it horizontally, into which anchor plates, attached to the cable ends as described in application Serial No. 844,441, may slide from opposite sides of the coupler. A slot 30 along the front face of the coupler opens to the channel and accommodates the cables which are attached to the anchor plates. The slot is of less width than the channel, leaving overhanging lips 31 at the top and bottom of the channel to engage the edges of the anchor plates and hold them in the coupler. The opposite end of the shaft carries spaced enlargements 32 and 33. Enlargement 33 at the end of the shaft forms a foot to be engaged by a jack, to tension the cables as will be described. Enlargement 32, spaced inwardly from the enlargement 33, provides a locking shoulder upon which a U-shaped locking clip may bear when slipped over the shaft to hold the shaft against longitudinal sliding movement relative to the header.

When cables are to be strung in the header, the cables may be wrapped around post 15 of the dead end header 3 by a machine such as disclosed in application Serial No. 844,441. The bights of the cables will lie in the grooves 16 and 17 of the post. The cables will extend the length of the pallet and have their free ends anchored in plates, as described, and the anchor plates will be slipped into the channel 29 in the coupler 28, the cables extending through the slot 30. While the pallet is held immovable, a suitable jack will engage the enlargement 33 on the jack shaft and pull the shaft axially to tension the cables to the proper degree. While the cables are held tensioned by the jack, a spacer 34 of proper width will be slipped over shaft 27 between the back wall 22 of the header 4 and the enlargement 32 on the jack shaft to hold the shaft against retractive movement when the jack is released. Thus, the cables will be held under tension by the pallet, and a suitable concrete member can be poured about them, tamped, vibrated and cured. After the concrete is cured, the cable ends may be cut free from the pallet and the cured prestressed member removed from the pallet.

Referring now to that form of the invention shown in FIGURES 6 through 9, the construction is somewhat different. While both forms of pallet have been illustrated as for molding railway ties, the tie is molded and supported with its bottom against the base of the pallet in the previously described form, while the tie will be inverted in the form shown in FIGURES 6 through 9.

In the second form of the invention, the pallet 35 is an elongated, trough shaped member having a flat bottom 36 and upwardly diverging side walls 37. The ends are formed by headers 38 and 39 which span the ends of the trough 40. Header 38 is rigidly fixed to the trough end and is a permanent part of the trough, while header 39 is a movable one having no permanent connection to the trough. The side walls 37 are part of tubular struts 41 which extend the length of the trough and are designed to have their ends in abutment with the headers, and hold the headers, in predetermined spaced relation against the pull of stressed cables strung between the headers. In the embodiment shown, the struts are fabricated members, composed of the side walls 37 of the trough, horizontal top flanges 42 of the trough, and angle members 43. The angle members can be a heavier construction than the trough material and so take the major portion of the compression load. The important factor is to have the pallets include longitudinal struts, or other longitudinally extending load-carrying members, capable of acting as spacers for the header, whereby the headers, with cables strung between them, may be separated a known distance to tension the cables to a predetermined extent and held at the given spacing to maintain the desired tension on the cables. This makes the pallets self-sustaining, and permits them to be removed from the casting machine while the concrete is green, and yet maintain the cable tension during curing.

Fixed header 38 is channel-shaped in cross-section, having vertical web 44, which forms the end wall of the trough, and horizontal, outwardly projecting flanges 45. It will be noted (FIGURE 8) that the header 38 is inclined slightly so that an upwardly flaring, tapered gap 46 is left open between the header and the end of the trough. Header 38 has a plurality of openings 47 in its web 44 to receive stressing cables. The openings are arranged in the pattern selected for the cables, and a cable anchor 48 is attached to the header in alignment with each opening 47.

At the end of the pallet opposite the fixed header 38, the base flanges 49 of the angle member 43 project beyond the end of the trough to provide ledges 50 upon which the moveable header 39 may seat. Header 39 is also channel-shaped, having a vertical web 51 and outwardly projecting flanges 52. This header has cable openings 53 and anchors 54. The pattern of the openings 53 will be the same as the pattern of openings 47 in header 38 and similarly postioned on the header. In other words, if the group of openings is centered on header 38, the group will be centered on header 39.

Header 39 has a pair of spacer lugs 55 projecting inwardly from the back wall of web 51. These lugs are spaced apart a proper distance to seat upon the ends of tubular struts 41 when the header 39 is centered across the open end of the pallet trough. However, when the header is shifted laterally of the pallet the lugs will not be in contact with the struts, but the header will have its web 51 in contact with the strut ends. It will be obvious that the distance between the two headers will be less in this latter position. It is also obvious that the header is not centered with respect to the trough in this latter position. The reasons for these two positions will be described later.

Each pallet has four openings 56 in its bottom, the openings being in pairs near the ends of the trough and in longitudinal alignment along the centerline of the trough bottom. A stool 57 having an opening 58 matching the opening 56 is fixed to the pallet trough bottom about each opening. The stools have threaded openings 59 in their tops to receive bolts 60 which pass through holes 61 in the base flange 62 of rubber anchor-mounting studs 63. The studs are hollow with closed upper ends 64, and are threaded along their exterior surfaces, as at 65.

When the pallet is to be used, metal anchors of the general type shown in application Serial No. 344,095 are inserted over the rubber anchor-mounting studs 63 and the movable header 39 is seated upon the ledges 50 of the pallet. Header 39 will be seated in its laterally offset position wherein the lugs 5 lie one within and one without the pallet and the web 51 of the pallet will contact the ends of tubular struts 41. This is the position in which the headers are closest together. The cables will then be inserted through the anchors on the headers and strung along the pallet with their ends held in the anchors 48 and 54. The fact that header 39 is offset will cause the cables to lie at an angle to the centerline of the pallet. If a jack is now inserted in the pallet with its bearing members in contact with the respective headers at their centers, and the jack operated to separate the headers, the cables will be tensioned. As soon as the headers are separated sufficiently to allow the lugs 55 on the header 39 to clear the ends of struts 41, the pull of the cables will cause the pallet and header 39 to snap into alignment, so that when the pressure of the jack is released, lugs 55 will seat against the ends of struts 41. The length of the lugs is sufficient to increase the distance between the headers enough to hold the cables under desired tension. The concrete can now be poured as before. When the concrete is cured, the cables can be cut and the concrete member removed. The angular relation of fixed header 38 will facilitate machine threading of cables through the headers and machine cutting of the cables after the concrete has cured.

While in the above several forms of the invention have been disclosed, it will be apparent that the details of structure shown and described are merely by way of example, and the invention may take other forms within the scope of the appended claims.

What is claimed is:

1. A portable pallet for molding prestressed concrete members comprising, a trough-shaped body, a header bridging one end of the body and fixed thereto, ledges extending from the opposite end of the body, a movable header separate from the body and seatable on the ledges in bridging relation to the end of the body, load-bearing struts along the side of the body extending the full length of the body having their ends abutting the headers, said headers each having a similar pattern of cable-receiving openings therein with a cable anchor at each recess, whereby stressing cables may be strung along the pallet with the cable ends anchored in the headers, and said movable header having spacing lugs thereon, the spacing lugs being located on the movable header a distance apart equal to the spacing of the load bearing struts so as to permit the header to seat against the ends of the body struts with the spacing lugs lying alongside the struts when the movable header is offset laterally relative to the pallet body to receive cables, and to permit the spacing lugs to seat against the ends of the body struts when the movable header is centered relative to the body to space the movable header an increased distance from the fixed header to tension, and hold tensioned, cables having their ends anchored in the pallet headers.

2. A portable pallet for molding prestressed concrete members as claimed in claim 1 wherein, there are means along the bottom of the trough-shaped body to releaseably engage and hold bolt anchors in position for embedment in the concrete member when molded.

3. A portable pallet assembly for use in making prestressed concrete members comprising, a pallet and a pair of headers, the pallet having a base to support the concrete member and at least adjacent its ends being of U-shaped cross-section, said headers each having means to engage and hold stressing cable strung between them and being of sufficient length to bridge the U-shaped ends of the pallet with the cables held under tension between them, the means to engage and hold stressing cable of one of the headers being post-forming means about which a stressing cable may be bent, the means to engage and hold stressing cable of the other header including a jacking shaft normal to the pallet-bridging extent of the header and slidable in the header, the jacking shaft carrying a coupler engaging the ends of cable bent about the post-forming means at one end and means engageable by a jack at the opposite end, and means to hold the jacking shaft in at least one position of slidable adjustment relative to the header which carries it.

References Cited by the Examiner

UNITED STATES PATENTS

| 974,372 | 11/1910 | Fullenkamp | 25—121 |
| 2,556,928 | 6/1951 | Ludlow | 25—118 |
| 2,695,754 | 11/1954 | Karig | 25—118 |
| 2,966,717 | 1/1961 | Fuller et al. | 25—118 |
| 3,013,372 | 12/1961 | Carr | 25—118 |
| 3,070,867 | 1/1963 | Belle | 25—118 |
| 3,132,403 | 5/1964 | Richards et al. | 25—118 |

FOREIGN PATENTS 144,193  6/1920  Great Britain.

J. SPENCER OVERHOLSER, *Primary Examiner.*

MICHAEL V. BRINDISI, *Examiner.*

G. A. KAP, *Assistant Examiner.*

UNITED STATES PATENT OFFICE
CERTIFICATE OF CORRECTION

Patent No. 3,281,911                                November 1, 1966

Robert S. Baker

It is hereby certified that error appears in the above numbered patent requiring correction and that the said Letters Patent should read as corrected below.

In the heading to the printed specification, lines 3 to 5, strike out "assignor, by mesne assignments, to American Concrete Crosstie Corporation, Tampa, Fla., a corporation of Florida" and insert instead -- assignor, by mesne assignments, of one-third each to J. L. Cone, Jr., C. W. Cone and Douglas P. Cone, Tampa, Fla., as tenants in common --.

Signed and sealed this 5th day of September 1967.

(SEAL)
Attest:

ERNEST W. SWIDER                              EDWARD J. BRENNER
Attesting Officer                                    Commissioner of Patents